May 29, 1956   J. F. YATSKO   2,747,276
CLIPPING CATCHER FOR POWER HEDGE TRIMMERS
Filed Nov. 25, 1953
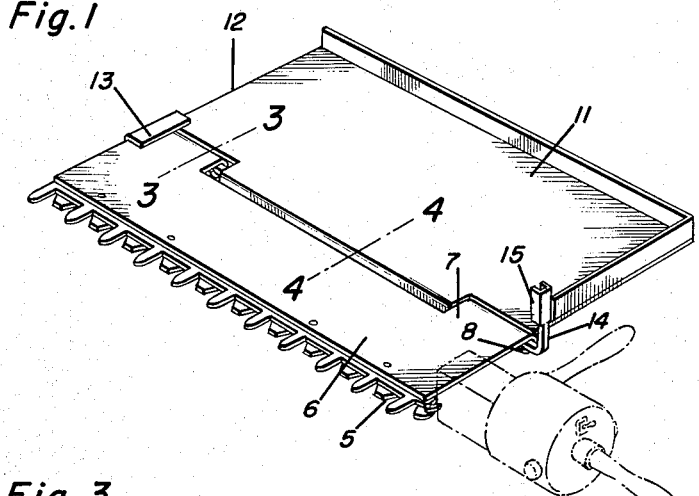
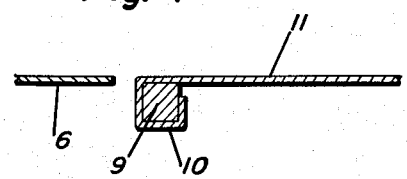
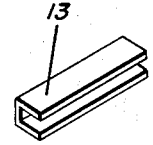
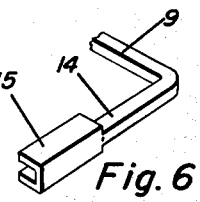
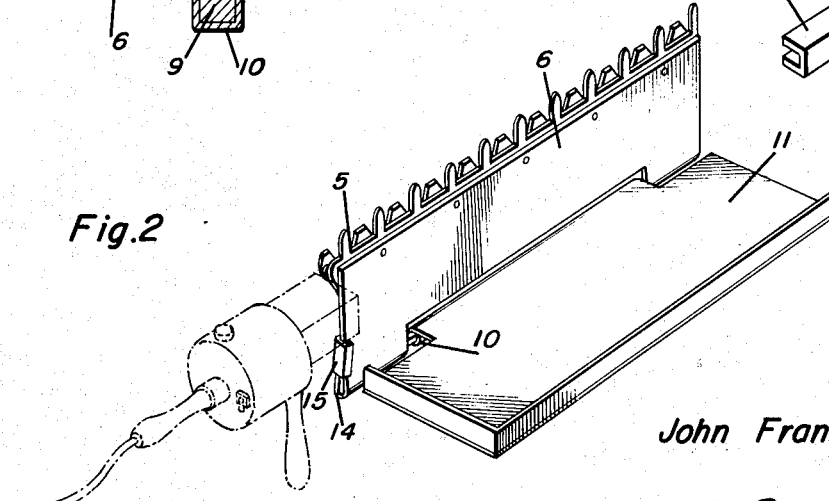
John Frank Yatsko
INVENTOR.

2,747,276

CLIPPING CATCHER FOR POWER HEDGE TRIMMERS

John Frank Yatsko, Wilkes-Barre, Pa.

Application November 25, 1953, Serial No. 394,297

4 Claims. (Cl. 30—132)

The present invention relates to new and useful improvements in power operated hedge trimmers and more particularly to an attachment for catching the clippings cut by the trimmer to prevent the same from falling on the ground or on top of the hedge.

An important object of the invention is to provide a clipping catcher which may be adjusted to effectively catch the clippings when the trimmer is used either in a horizontal position on top of the hedge, or when the trimmer is used in a vertical position at the side of the hedge.

Another object is to provide an attachment of this character of simple and practical construction, which is efficient and reliable in operation, relatively inexpensive to manufacture, and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the clipping catcher in position when trimming the top of a hedge;

Figure 2 is a perspective view with the catcher in position when trimming the side of the hedge;

Figures 3 and 4 are enlarged fragmentary sectional views of the hinge structure taken, respectively, on the lines 3—3 and 4—4 of Figure 1;

Figure 5 is an enlarged perspective view of the horizontal locking clip; and

Figure 6 is an enlarged perspective view of the vertical locking clip.

Referring now to the drawings in detail, wherein for the purpose of illustration I have disclosed a preferred embodiment of my invention, the numeral 5 designates a conventional type of reciprocating power operated hedge trimmer and on top of which is secured a flat stationary shield 6 which projects rearwardly behind the trimmer. Rearwardly projecting extensions 7 are formed adjacent each side edge of the shield and are rolled under the shield to form a pair of tubular hinge bearings 8 in which a hinge pin 9 of square shape in cross-section is rotatable.

The hinge pin also passes through a complementary shaped casing 10 formed at the front edge of a tray-like catcher 11. The casing 10 is positioned between and aligned with the bearings 8 and the hinge pin is tightly fitted in the casing to connect the same to each other for swinging movement of the catcher as the pin turns in the bearings. One end of the catcher is open, as shown at 12, to facilitate emptying the catcher of clippings by tilting the trimmer.

The catcher 11 is locked in a position coplanar with the shield 6, as shown in Figure 1, by means of a removable channel-shaped clip 13 which is slidable into a bridging position at one end edge of the shield and catcher and in this position the clippings will fall into the catcher as the trimmer is worked along the top of a hedge.

In Figure 2, the catcher is shown locked in a horizontal position at right angles to the vertically held trimmer and shield by means of an upstanding arm 14 at one end of hinge pin 9 and to which is slidably secured a channel-shaped locking clip 15 adapted to engage an adjacent edge portion of the shield. In this position, the trimmer is used to trim the side of a hedge and the clippings fall onto the horizontally supported catcher 11.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A clipping accumulator for hedge trimmers comprising a flat shield adapted for attaching to the trimmer, a tray-like catcher, a hinge structure connecting the catcher to the shield at the rear of the trimmer for swinging adjustment of the catcher relative to the plane of the trimmer, said hinge structure including a hinge pin rotatably connected to the shield and fixed to the catcher, an angularly extending arm at one end of the hinge pin, and a channel-shaped clip carried by the arm and in which an edge portion of the shield is engageable to lock the catcher in a predetermined position with respect to the trimmer.

2. The clipping catcher of claim 1 wherein said tray-like catcher has an upstanding wall on two edges, and one of its edges being open to allow the hedge trimmings to be emptied at this point.

3. The clipping catcher of claim 1 wherein said shield has spaced bearings in which said hinge pin is mounted for rotation, a casing on said catcher and located between said bearings, and said casing having a passage therethrough in which said hinge pin is disposed.

4. The clipping catcher of claim 1 wherein said shield has spaced bearings in which said hinge pin is mounted for rotation, a casing on said catcher and located between said bearings, said casing having a passage therethrough in which said hinge pin is disposed, said passage and said pin in said passage each being non-circular and similarly shaped in cross-section so that said hinge pin is constrained to move with said catcher.

References Cited in the file of this patent

UNITED STATES PATENTS

| 238,412 | Mast et al. | Mar. 1, 1881 |
| 1,166,702 | Mardon et al. | Jan. 4, 1916 |
| 1,581,343 | Hart | Apr. 20, 1926 |
| 2,281,189 | Wright | Apr. 28, 1942 |
| 2,357,678 | Mike | Sept. 5, 1944 |
| 2,490,889 | Stallard | Dec. 13, 1949 |
| 2,510,311 | Greene | June 6, 1950 |

FOREIGN PATENTS

| 20,225 | Great Britain | Sept. 12, 1911 |
| 56,048 | Denmark | Apr. 11, 1939 |